(12) United States Patent
Araki et al.

(10) Patent No.: US 10,051,070 B2
(45) Date of Patent: Aug. 14, 2018

(54) PROVIDING FEEDBACK IN A SCENE PRESENTED TO A USER BASED ON AN ACTIVITY OF THE USER

(71) Applicant: SONY CORPORATION, Tokyo (JP)

(72) Inventors: Kazunori Araki, Kanagawa (JP);
Shinobu Kuriya, Kanagawa (JP);
Masanori Miyahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 160 days.

(21) Appl. No.: 14/592,203

(22) Filed: Jan. 8, 2015

(65) Prior Publication Data
US 2015/0207891 A1 Jul. 23, 2015

(30) Foreign Application Priority Data
Jan. 17, 2014 (JP) ................. 2014-006740

(51) Int. Cl.
| | |
|---|---|
| *G06F 15/16* | (2006.01) |
| *H04L 29/08* | (2006.01) |
| *H04L 12/58* | (2006.01) |
| *H04L 29/06* | (2006.01) |

(52) U.S. Cl.
CPC .............. *H04L 67/22* (2013.01); *H04L 51/32* (2013.01); *H04L 67/38* (2013.01)

(58) Field of Classification Search
CPC ........ G06F 17/30056; G06F 17/30554; H04N 13/0271; H04N 9/045; H04N 13/0239; H04N 13/0242; H04N 5/23212; H04N 5/235; H04N 5/2355
See application file for complete search history.

(56) References Cited

U.S. PATENT DOCUMENTS

| | | | |
|---|---|---|---|
| 9,247,201 B2* | 1/2016 | Li ........................... A63F 13/12 | |
| 2013/0325963 A1* | 12/2013 | Suzuki .................. H04L 65/403 | 709/204 |
| 2014/0040258 A1* | 2/2014 | Schwartz .......... G06F 17/30058 | 707/736 |
| 2014/0095608 A1* | 4/2014 | Mandalia .......... G06F 17/30038 | 709/204 |
| 2015/0130814 A1* | 5/2015 | Taraki .................... G06T 11/40 | 345/441 |

FOREIGN PATENT DOCUMENTS

JP 2012-109795 A 6/2012

* cited by examiner

*Primary Examiner* — Djenane Bayard
(74) *Attorney, Agent, or Firm* — Chip Law Group

(57) ABSTRACT

There is provided an information processing device including an activity acquiring unit configured to acquire an activity of a first user in a first scene of content, a scene extracting unit configured to extract a second scene similar to the first scene from the content or another content, and a feedback diverting unit configured to divert a feedback that arises in the first scene in response to the activity of the first user, to the second scene provided to a second user.

12 Claims, 19 Drawing Sheets

FIG.4

| Scene_ID 1510 | Content_ID 1520 | Section 1530 | Actor/Actress 1540 | Volume 1550 | Comment 1560 | Generated 1570 |
|---|---|---|---|---|---|---|
| 0001 | 0101 | 00:12:34 00:15:22 | John, Paul | 3 | He's cool. | 0 |
| 0001 | 0101 | 00:12:34 00:15:22 | John, Paul | 3 | No way. | 0 |
| 0001 | 0101 | 00:12:34 00:15:22 | John, Paul | 3 | Paul, I'm in love with you. | 0 |
| 0004 | 0203 | 01:48:25 01:57:33 | George | 1 | It's boring. | 0 |
| 0004 | 0203 | 01:48:25 01:57:33 | Pete | 1 | Does anyone watch this? | 0 |
| 0007 | 0101 | 01:34:12 01:42:55 | Brian | 3 | I'm in love. | 1 |
| 0009 | 0314 | 00:11:34 00:14:32 | George | 2 | It's boring. | 1 |
| ... | ... | ... | ... | ... | ... | ... |

| Scene_ID | Place | Situation | HP | Action |
|---|---|---|---|---|
| 0001 | Dungeon | Entrance | 100% | Remark: "Talk to the guide first." |
| 0001 | Dungeon | Entrance | 100% | Talk to Guide |
| 0003 | Dungeon | Boss Encount | 5% | Remark: "Run away!" |
| 0003 | Dungeon | Boss Encount | 10% | Remark: "Heal me Please!" |
| 0003 | Dungeon | Boss Encount | 30% | Remark: "Range attack is coming!" |
| 0007 | Field | Attacked | 50% | Run around |
| 0009 | Field | Moving | 100% | Remark: "Follow me!" |
| ... | ... | ... | ... | ... |

PROVIDING FEEDBACK IN A SCENE PRESENTED TO A USER BASED ON AN ACTIVITY OF THE USER

CROSS REFERENCE TO RELATED APPLICATIONS

This application claims the benefit of Japanese Priority Patent Application JP 2014-006740 filed Jan. 17, 2014, the entire contents of which are incorporated herein by reference.

BACKGROUND

The present disclosure relates to an information processing device, an information processing method, and a program.

In recent years, feedbacks to the content of users are widely shared. For example, JP 2012-109795A describes a technology that presents a comment posted on the posting site to viewers viewing a currently on-air program.

SUMMARY

However, in the technology described in JP 2012-109795A, small amount of information is shared if the number of feedbacks to the content is few, and thereby the cases in which excitement of users arises by the posted comment are limited. Therefore, the present disclosure proposes a novel and improved information processing device, an information processing method, and a program capable of making the content exciting with a limited number of feedbacks from the user.

According to an embodiment of the present disclosure, there is provided an information processing device including an activity acquiring unit configured to acquire an activity of a first user in a first scene of content, a scene extracting unit configured to extract a second scene similar to the first scene from the content or another content, and a feedback diverting unit configured to divert a feedback that arises in the first scene in response to the activity of the first user, to the second scene provided to a second user.

According to an embodiment of the present disclosure, there is provided an information processing method including acquiring an activity of a first user in a first scene of content, extracting a second scene similar to the first scene from the content or another content, and diverting, by a processor, a feedback that arises in the first scene in response to the activity of the first user, to the second scene provided to a second user.

According to an embodiment of the present disclosure, there is provided a program for causing a computer to implement a function to acquire an activity of a first user in a first scene of content, a function to extract a second scene similar to the first scene from the content or another content, and a function to divert a feedback that arises in the first scene in response to the activity of the first user, to the second scene provided to a second user.

As described above, according to the present disclosure, the content is made exciting with a limited number of feedbacks from the user. Note that the above effects are not necessarily restrictive, but any effect described in the present specification or another effect that can be grasped from the present specification may be achieved in addition to the above effects or instead of the above effects.

BRIEF DESCRIPTION OF THE DRAWINGS

FIG. 4 is a diagram illustrating an example of data in a first embodiment of the present disclosure;

FIG. 16 is a diagram illustrating an example of data in a third embodiment of the present disclosure;

DETAILED DESCRIPTION OF THE EMBODIMENT(S)

Figure 1:
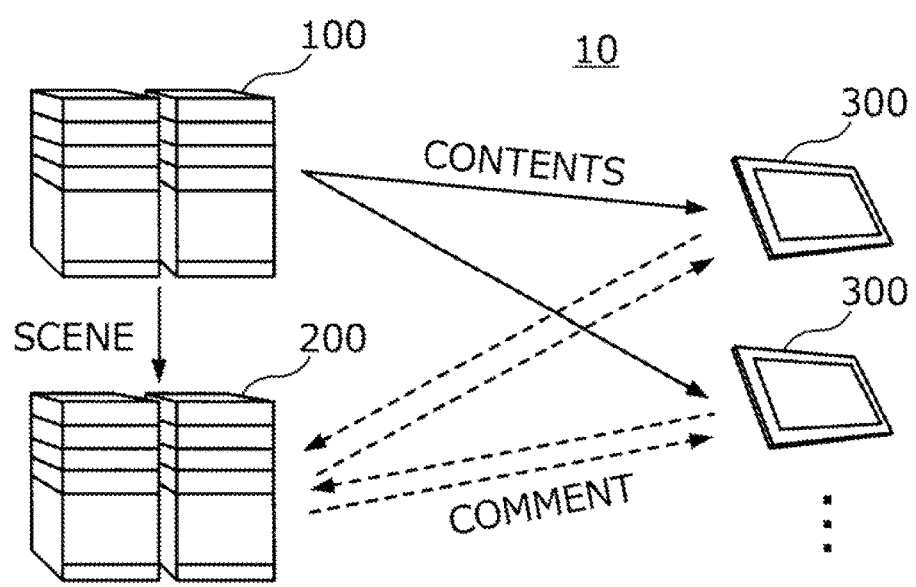
FIG. 1 is a diagram illustrating a configuration of a system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. First Embodiment
2. Second Embodiment
3. Third Embodiment
4. Hardware Configuration
5. Supplement (1. First Embodiment)

FIG. 1 is a diagram illustrating a configuration of a system according to the first embodiment of the present disclosure.

Referring to FIG. 1, the system 10 includes a content server 100, a comment server 200, and terminal devices (clients) 300. The content server 100, the comment server 200, and the terminal devices 300 are connected to each other by a network.

The content server 100 and the comment server 200 are configured by one or more server devices. The server device can be realized by the hardware configuration of the information processing device described later. The content server 100 and the comment server 200 provide service to a plurality of the terminal devices 300. More specifically, the content server 100 delivers content to the terminal devices 300. The user of each of the terminal devices 300 can view and listen to the content delivered from the content server 100. The comment server 200 receives comment input by the users of the terminal devices 300 who view and listen to the content, and then delivers the received comment to other terminal devices 300. Also, as described later, the content server 100 may provide, to the comment server 200, information indicating the scene of the content provided to the terminal devices 300 at present.

The terminal device 300 may be various types of terminal devices capable of receiving and displaying the delivered content, such as for example a tablet terminal, a smartphone, a television, a personal computer, or a game machine. Also, the terminal device 300 accepts an input of a comment by the user who views and listens to the content. The terminal device 300 can be realized by the hardware configuration of the information processing device described later, for example. As above, to the terminal device 300, the content is delivered from the content server 100, as well as the comment of another user is delivered from the comment server 200. Thereby, the user of the terminal device 300 can refer to the comment input by another user in addition to the content, and input a new comment. That is, the user of the terminal device 300 can enjoy interacting with another user by the comment relevant to the content, as well as viewing and listening to the content.

In order for the interaction with another user by the comment relevant to the content to arise as above, at least two user, preferably more users, input the comments while viewing and listening to the content at the terminal devices 300. However, for example, when the users are few because the service itself provided by the comment server 200 is new, or in the time period such as early morning when the users are few, the users who input the comment are few, and thereby there is a possibility that the interaction does not arise only by the comment actually input by the users. In addition, when there is no comment of another user, there is a possibility that the user determines that the input comment will probably be a soliloquy and refrains from inputting a new comment.

Therefore, in the present embodiment, the comment server 200 delivers the comment generated by diverting the comment that the user has input in the scene of other content or in another scene of the same content, to the scene of the currently delivered content. These comments are delivered to and displayed at the terminal device 300, and thereby not only the excitement of the content is staged by the comment as if actually input by the user, but also the diverted comment serves as priming water to possibly encourage the user who views and listens to the content but has not input a comment (potential) to input a new comment in order for the interaction between the user to arise.

Figure 2:
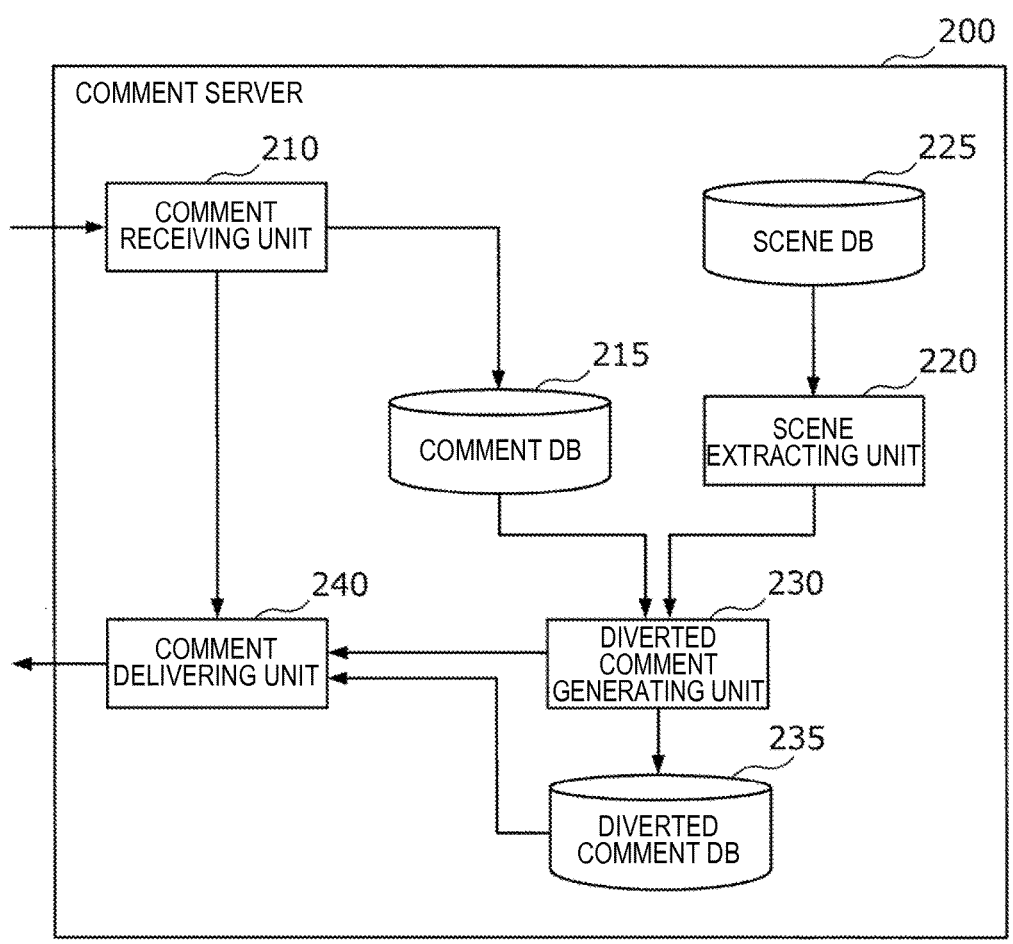
FIG. 2 is a diagram illustrating a schematic function and structure of a comment server according to a first embodiment of the present disclosure.

FIG. 2 is a diagram illustrating the schematic function and structure of the comment server according to the first embodiment of the present disclosure. Referring to FIG. 2, the comment server 200 includes a comment receiving unit 210, a scene extracting unit 220, a diverted comment generating unit 230, and a comment delivering unit 240. Each of their functions and structures can be realized by the processor of the server device configuring the comment server 200 which operates in accordance with programs stored in a memory or a storage. Also, the comment server 200 may also include a comment DB 215, a scene DB 225, and a diverted comment DB 235. These databases can be realized by a memory or a storage of the server device that configures the comment server 200, for example. In the following, these functions and structures will be described.

The comment receiving unit 210 receives the comment input by the user at the terminal device 300. The comment receiving unit 210 stores the received comment in the comment DB 215, in association with the information indicating the scene of the content that the content server 100 delivers to the terminal device 300 at the time of reception. Also, the comment receiving unit 210 provides the received comment to the comment delivering unit 240, in order to deliver the received comment in real time to other terminal devices 300. Here, the input is an example of the activity of the user in the scene of the content. Note that, in the present embodiment, the scene of the content means a section having some sort of meaning (for example, cut, verse, chorus, and the like), which is defined in the content (for example, video content and music content) that develops along the time axis.

The scene extracting unit 220 extracts a scene similar to the scene of the content that the content server 100 delivers, from the scenes of other content or other scenes of the same content. For example, the scene extracting unit 220 may extract the similar scene on the basis of the meta information and the feature value stored in the scene DB 225. For example, the meta information is given to each scene, and indicates the player related to the scene (the actor and actress of video content, the performer of music content, and the like), the attribute of the scene (introduction, climax, and the like), and others. For example, the feature value is calculated by analyzing the image or the sound in the scene, and indicates a visual or audible feature of the scene (bright, dark, bustling, quiet, and the like).

The diverted comment generating unit 230 reads out, from the comment DB 215, the comment input in the scene extracted by the scene extracting unit 220, and generates the diverted comment corresponding to the scene of the content delivered by the content server 100 on the basis of this comment. The comment is an example of the feedback that arises in the scene of the content by the activity of the user. In the present embodiment, the diverted comment generating unit 230 causes the comment that arises in a certain scene, to arise in another similar scene. For example, the diverted comment generating unit 230 may utilize the comment read out from the comment DB 215 without alteration as the diverted comment, or may re-create the comment using the keyword extracted from the comment read out from the comment DB 215. The diverted comment generating unit 230 provides the generated comment to the comment delivering unit 240, for the purpose of delivering the generated comment together with the comment received in real time (which is not present in some cases). Note that the diverted comment generated by the diverted comment generating unit 230 may be stored in the diverted comment DB 235 that is different from the comment DB 215, in a separate manner from the comment input by the normal user. Alternatively, the diverted comment may be stored in the comment DB 215 together with the normal comment. In this case, the diverted comment DB 235 is not necessarily provided.

The comment delivering unit 240 delivers the comment received by the comment receiving unit 210, and the diverted comment generated by the diverted comment generating unit 230, to the terminal device 300. The delivered comment is output as an image or a sound for example, at the terminal device 300. More specifically, for example, the comment delivering unit 240 may deliver the information for displaying the screen image which is displayed together with the display screen image of the content delivered from the content server 100, and which presents the comment on the timeline. In this screen image, the diverted comment may be displayed in the same way as the comment actually input by another user.

Figure 3:
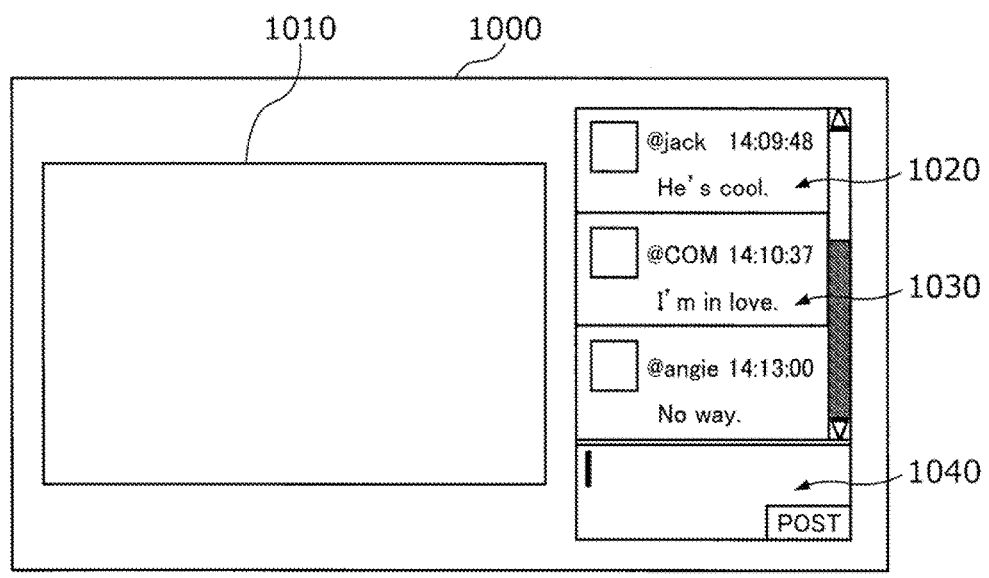
FIG. 3 is a diagram illustrating an exemplary display of a first embodiment of the present disclosure.

FIG. 3 is a diagram illustrating an exemplary display of the first embodiment of the present disclosure. Referring to FIG. 3, the screen image 1000 displayed on the display of the terminal device 300 in the present embodiment includes a content image 1010, a user input comment 1020, a diverted comment 1030, and a comment input area 1040.

In the content image 1010, the video content delivered from the content server 100 is displayed. The comment that the user viewing and listening to the content inputs for the scene of this content is displayed as the user inputs the comment 1020. The comment server 2000 receives the comment input by the user from the terminal device 300, and delivers the received comment to other terminal devices 300, so that the comment 1020 input by the user is displayed. The diverted comment 1030 is the comment that the comment server 200 generates for a scene of the content, on the basis of the comment input in another scene similar to that scene, as described above. The user of the terminal device 300 can input a new comment using the comment input area 1040. The input comment can be used in the generation of the diverted comment 1030 in another scene by the comment server 200.

FIG. 4 is a diagram illustrating an example of the data in the first embodiment of the present disclosure. Referring to FIG. 4, the data 1500 stored in the database of the comment server 200 in the present embodiment includes a scene ID 1510, a content ID 1520, a scene section 1530, an actor and an actress 1540, a sound volume 1550, a comment 1560, and a generation flag 1570.

The scene ID 1510 is an ID for uniquely identifying the scene over the boundary of the content. The content ID 1520 is an ID for identifying the content in which each scene is defined. The scene section 1530 indicates the section of the scene defined in the content, by the time stamp. The actor and actress 1540 is an example of the meta information indicating the player related to the scene. The sound volume 1550 is an example of the feature value indicating the auditory feature of the scene. The scene section 1530 is defined on the basis of the actor and actress 1540 and the sound volume 1550, for example. In the example illustrated in the drawing, the scene section 1530 is defined on the basis of the combination of the actor and actress 1540 and the three-step sound volume 1550. The scene section 1530 may be automatically defined by the content server 100 or the comment server 200 that detects the actor and actress and the sound volume of the content, or may be given in advance by the provider of the content, for example.

In the example illustrated in the drawing, the generation flags 1570 are "0" in the records 1500a to 1500e of the data 1500. That is, the comments 1560 in these records are actually input in the terminal devices 300. On the other hand, the generation flags 1570 are "1" in the records 1500f, 1500g. That is, the comments 1560 in these records are generated on the basis of the comment input in the past by the diverted comment generating unit 230 of the comment server 200. For example, the comment 1560 of the record 1500g is generated by diverting the comment 1560 of the record 1500d without alteration. Also, the comment 1560 of the record 1500f is re-created using the keyword extracted from the comment 1560 of the record 1500c.

Although, in the example illustrated in FIG. 4 above, the data of the comment DB 215, the scene DB 225, and the diverted comment DB 235 in the comment server 200 is stored in a combined or integrated manner, the data may be stored in a separate manner in order to be combined and used as necessary. For example, the scene ID 1510 and the comment 1560 in the above data may be stored in the comment DB 215 and the diverted comment DB 235, and the scene ID 1510, the content ID 1520, the scene section 1530, the actor and actress 1540, and the sound volume 1550 may be stored in the scene DB 225.

Figure 5:
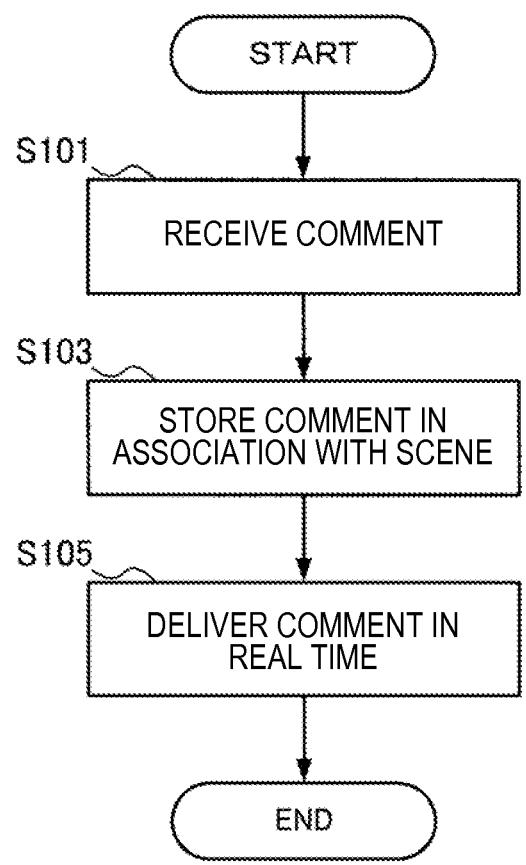
FIG. 5 is a flowchart illustrating an example of a process during a comment acquisition in a comment server according to a first embodiment of the present disclosure.

FIG. 5 is a flowchart illustrating an example of the process during the comment acquisition in the comment server according to the first embodiment of the present disclosure. Referring to FIG. 5, in the comment server 200, the comment receiving unit 210 receives the comment input by the user of the terminal device 300 (S101). For example, the comment receiving unit 210 identifies the scene of the content for which the comment is input, on the basis of the information provided from the content server 100, and stores the comment in the comment DB 215 in association with (the information indicating) the scene (S103). Meanwhile, the comment receiving unit 210 delivers the received comment via the comment delivering unit 240 to other terminal devices 300 (S105).

Figure 6:
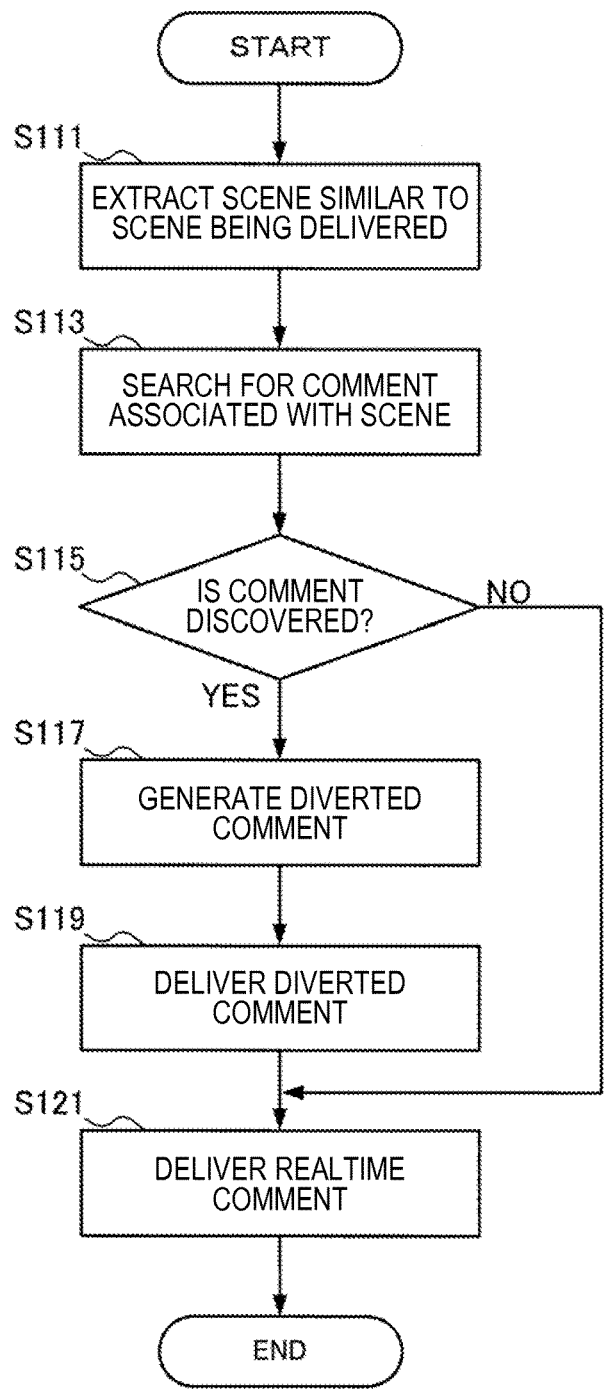
FIG. 6 is a flowchart illustrating an example of a process for a comment delivery in a comment server according to a first embodiment of the present disclosure.

FIG. 6 is a flowchart illustrating an example of the process for the comment delivery in the comment server according to the first embodiment of the present disclosure. Referring to FIG. 6, in the comment server 200, first, the scene extracting unit 220 extracts the scene similar to the scene of the content delivered by the content server 100, with reference to the scene DB 225 (S111). Thereafter, the diverted comment generating unit 230 searches the comment DB 215 for the comment associated with the scene extracted in S111 (S113). If the comment is discovered (YES of S115), the diverted comment generating unit 230 generates a diverted comment on the basis of the discovered comment (S117), and the comment delivering unit 240 delivers the diverted comment (S119).

On the other hand, in S115, if the comment associated with the extracted scene is not discovered, or if the scene is not extracted (NO), the diverted comment generating unit 230 does not generate the diverted comment. Regardless of the presence or absence of the diverted comment, the comment delivering unit 240 also delivers the real-time comment received by the comment receiving unit 210 (S121). The process for the comment display as above is executed for example when the comment receiving unit 210 receives the comment, or at the timing of change of the scene of the content delivered by the content server 100, or on a regular basis, so that the real-time comment and the diverted comment corresponding to the content are displayed at the terminal device 300.

(2. Second Embodiment)

Figure 7:
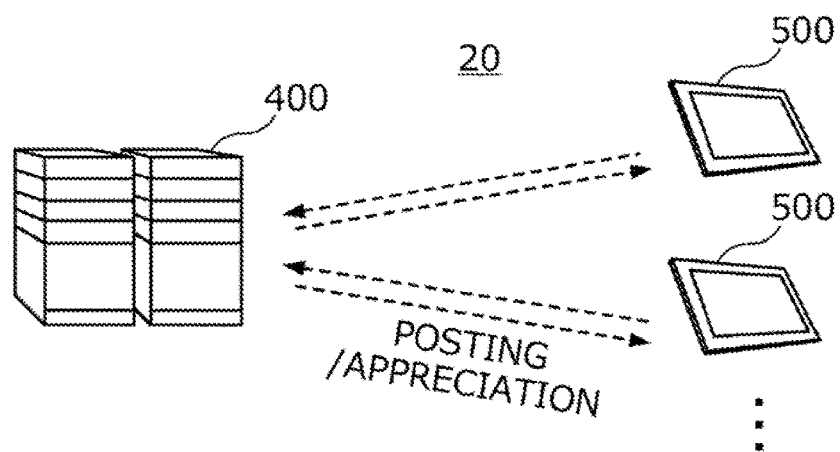
FIG. 7 is a diagram illustrating a configuration of a system according to a second embodiment of the present disclosure.

FIG. 7 is a diagram illustrating the configuration of the system according to the second embodiment of the present disclosure. Referring to FIG. 7, the system 20 includes a social media server 400, and terminal devices (clients) 500.

The social media server 400 and the terminal devices 500 are connected to each other by a network.

The social media server 400 are configured by one or more server devices. The server device can be realized by the hardware configuration of the information processing device described later. The social media server 400 provides the service to a plurality of the terminal devices 500. More specifically, the social media server 400 receives the posting input by the user of the terminal devices 500, and delivers the received posting as the content of the social media, to other terminal devices 500. Also, the social media server 400 accepts the appreciation to the posting that the users of the terminal devices 500 give for the posting of another user. When the appreciation is given to the posting, the appreciation is displayed together with the posting at the terminal device 500.

The terminal device 500 can be various types of terminal devices capable of receiving input of the posting and the appreciation and capable of receiving and displaying the delivered posting and appreciation, such as for example, a tablet terminal, a smartphone, a television, a personal computer, or a game machine. The terminal devices 500 can be realized by the hardware configuration of the information processing device described later, for example. As above, the posting is delivered to the terminal device 500 from the social media server 400, and a new posting is input at the terminal device 500 to be transmitted to the social media server 400. Also, in the terminal device 500, the appreciation is given to the posting input by another user. Thereby, the user of the terminal devices 500 can enjoy the interaction with another user via the posting and the appreciation.

In order for the above interaction to arise, the posting input by the user is to be browsed by another user, and in addition the appreciation is to be given by another user. However, for example, when the user recently joined the social media, it is possible that the appreciation is not given to the posting and the interaction does not arise, because another user referring to the posting is few.

Therefore, in the present embodiment, the social media server 400 recognizes the situation on the social media when the user does the posting on the social media (the content) as the scene (the second scene), and gives the appreciation given to the posting of another user made in the same situation of the past (the first scene), to the posting of the user in the second scene. Thereby, for example, the user who recently joined the social media can experience the interaction via the posting and the appreciation in a simulated manner, and before very long an appreciation is actually given to the posting from another user, in order for the interaction to arise possibly.

Figure 8:
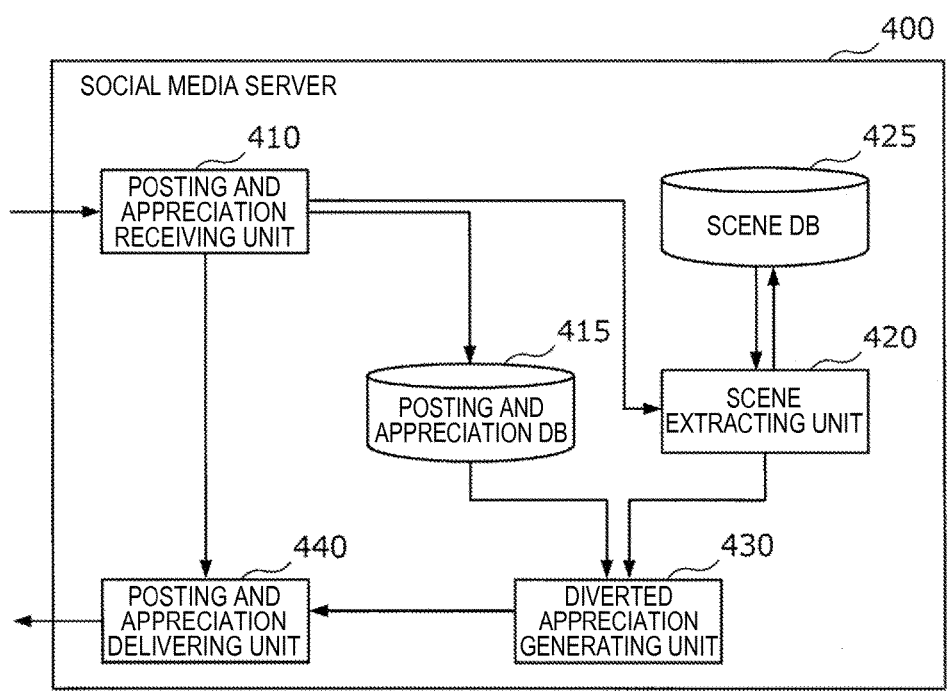
FIG. 8 is a diagram illustrating a schematic function and structure of a social media server according to a second embodiment of the present disclosure.

FIG. 8 is a diagram illustrating the schematic function and structure of the social media server according to the second embodiment of the present disclosure. Referring to FIG. 8, the social media server 400 includes a posting and appreciation receiving unit 410, a scene extracting unit 420, a diverted appreciation generating unit 430, and a posting and appreciation delivering unit 440. Each of their functions and structures can be realized by the processor of the server device configuring the social media server 400 which operates in accordance with programs stored in a memory or a storage. Also, the social media server 400 may also include a posting and appreciation DB 415, and a scene DB 425. These databases can be realized by the memory or the storage of the server device configuring the social media server 400, for example. In the following, these functions and structures will be further described.

The posting and appreciation receiving unit 410 receives the posting and the appreciation input by the user at the terminal device 500, from the terminal device 500. The posting and appreciation receiving unit 410 stores the received posting and the appreciation in the posting and appreciation DB 415, in association with the information indicating the situation on the social media of the poster when the appreciation is received, for example. Also, the posting and appreciation receiving unit 410 provides the received posting and the appreciation to the posting and appreciation delivering unit 440, in order to deliver the received posting and the appreciation in real time.

Here, in the present embodiment, the situation on the social media (the elapsed period from the start of the service utilization, the number of friends on the social media, and the like) is treated as the scene defined in the content (the social media). That is, in the present embodiment, the scene means a specific situation (for example, less than one week from the start of the service utilization, less than three friends on the social media, and the like), which is defined in the content (for example, the social media) in which the situation surrounding the user changes along the time axis. In this meaning, giving the appreciation to the posting is an example of the activity of the user in the scene of the content.

The scene extracting unit 420 extracts the situation similar to the situation on the social media of the user A who has posted on the social media, with reference to the scene DB 425. The situation of the user B when the appreciation is given by yet another user C to the posting of user B different from the user A on the social media is registered in the scene DB 425. In other words, the scene extracting unit 420 determines whether the situation when the user posts (specifically, the elapsed period from the start of the service utilization, the number of friends on the social media, and the like, for example) is similar to the situation of another user when an appreciation is given to the posting of the another user. Note that the situation registered in the scene DB 425 may be actually-arising situations clustered and registered in the scene DB 425 as a finite number of groups.

When it is determined that the situation when the situation is extracted by the scene extracting unit 420, that is, when the user does the posting, is similar to the situation of another user when the appreciation is given to the posting of the another user, the diverted appreciation generating unit 430 reads out the appreciation given to the posting of the another user from the posting and appreciation DB 415, and gives it to the posting of the user. Giving the appreciation to the posting is an example of the feedback that arises by the activity of the user to the scene of the content (the situation of the social media). The diverted appreciation generating unit 430 provides the newly given appreciation to the posting and appreciation delivering unit 440, in order to deliver the newly given appreciation together with the posting.

The posting and appreciation delivering unit 440 delivers the posting received by the posting and appreciation receiving unit 410 (including what is received in the past and stored in the posting and appreciation DB 415), and the diverted appreciation generated by the diverted appreciation generating unit 430, to the terminal device 500. The delivered posting and appreciation is output as an image for example, by the terminal device 500. The posting and the appreciation may be displayed on the timeline together with other content of the social media for example. In this image, the diverted appreciation may be displayed as the appreciation given to the posting of the user, in the same way as the appreciation given by another user and received by the posting and appreciation receiving unit 410.

Figure 9:
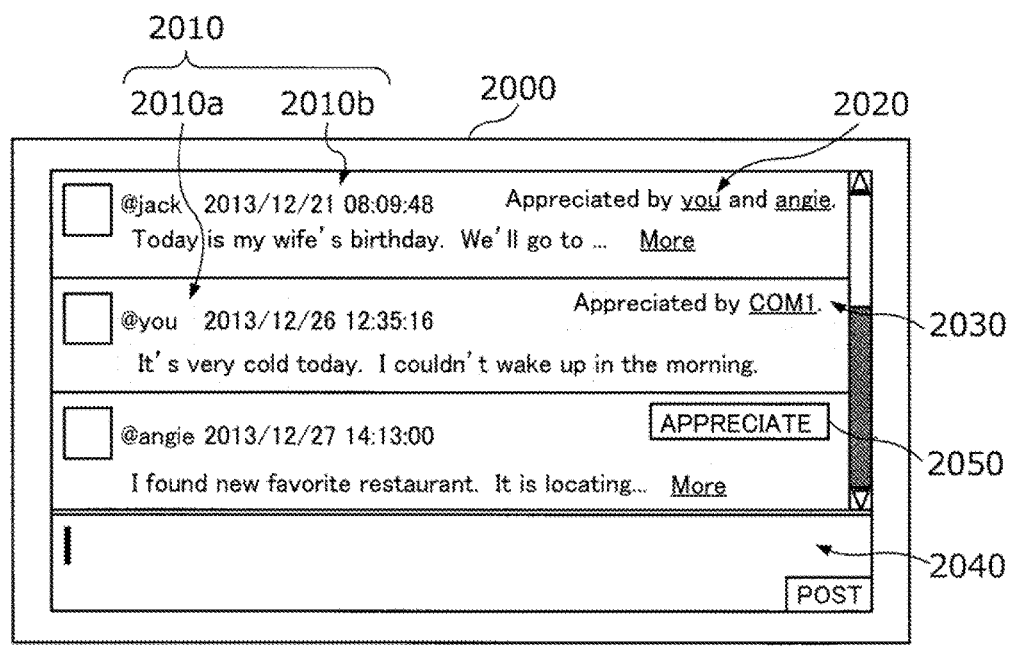
FIG. 9 is a diagram illustrating an exemplary display of a second embodiment of the present disclosure.

FIG. 9 is a diagram illustrating an exemplary display of the second embodiment of the present disclosure. Referring to FIG. 9, the screen image 2000 displayed on the display of the terminal devices 500 in the present embodiment includes a posting 2010, an appreciation 2020, a diverted appreciation 2030, a posting input area 2040, and an appreciation input area 2050.

The posting 2010 is displayed by the social media server 400 which receives the posting transmitted from a terminal device 500, and delivers to other terminal devices 500. The posting 2010 includes the posting 2010a input by the user of the terminal devices 500 by himself or herself, and the posting 2010b input by another user. The appreciation 2020 is displayed by the social media server 400 which receives the appreciation transmitted from a terminal device 500 and delivers it to other terminal devices 500. As described above, the diverted appreciation 2030 is the appreciation that the social media server 400 gives on the basis of the appreciation given to another posting in the situation equal or similar to a situation on a social media on the basis of the situation. The user of the terminal devices 500 can input a new posting using the posting input area 2040, and give the appreciation to the posting of another user, using the appreciation input area 2050. The given appreciation is utilized later to generate the diverted appreciation 2030 for the posting input by another user in the same situation.

Figure 10:
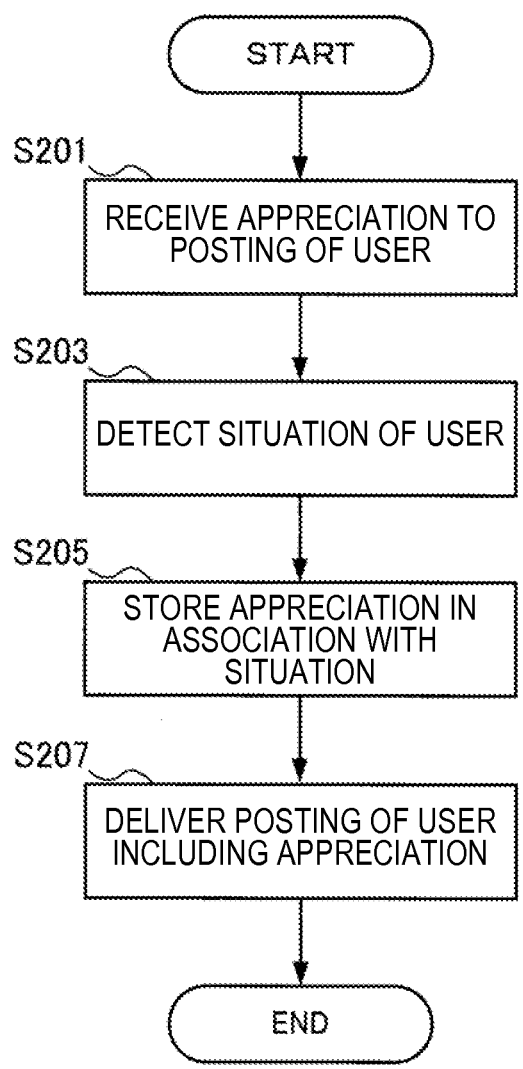
FIG. 10 is a flowchart illustrating an example of a process during an appreciation reception in a social media server in a second embodiment of the present disclosure.

FIG. 10 is a flowchart illustrating an example of the process during the appreciation reception in the social media server in the second embodiment of the present disclosure. Referring to FIG. 10, in the social media server 400, the posting and appreciation receiving unit 410 receives the appreciation input by another user for the posting of the user, from the terminal devices 500 (S201). The posting and appreciation receiving unit 410 detects the situation on the social media of the user who did the posting to be appreciated (S203), and stores the appreciation in the posting and appreciation DB 415 in association with (the information indicating) the situation (S205). Also, the posting and appreciation receiving unit 410 delivers the posting of the user including the newly given appreciation, to other terminal devices 500 via the posting and appreciation delivering unit 440 (S207).

Figure 11:
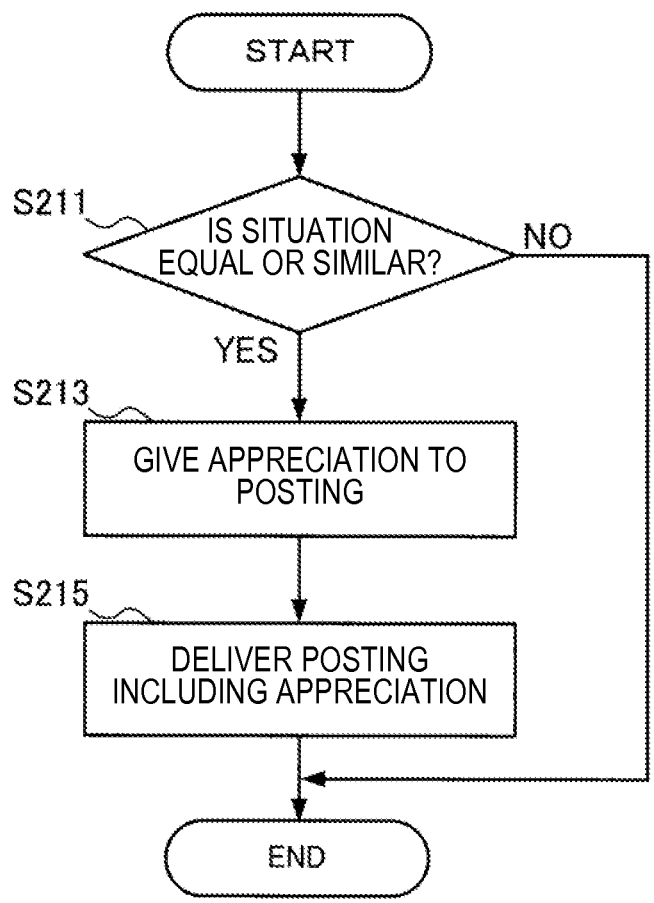
FIG. 11 is a flowchart illustrating an example of a process for an appreciation display in a social media server in a second embodiment of the present disclosure.

FIG. 11 is a flowchart illustrating an example of the process for the appreciation display in the social media server in the second embodiment of the present disclosure. Referring to FIG. 11, in the social media server 400, first, the scene extracting unit 420 determines whether or not the situation of the user who does the posting on the social media is equal or similar to the situation registered in the scene DB 425, that is, the situation of another user when the appreciation is given to the posting of another user, with reference to the scene DB 425, (S211). Here, if the situation of the user is equal or similar to the registered situation (YES), the diverted appreciation generating unit 430 gives the appreciation to the posting of the user (S213), and the posting and appreciation delivering unit 440 delivers the posting including the given appreciation (S215). By the above process, the appreciation is automatically given to the posting of the user (by the social media server 400), in the situation where the appreciation is given to the posting of another user.

(3. Third Embodiment)

Figure 12:
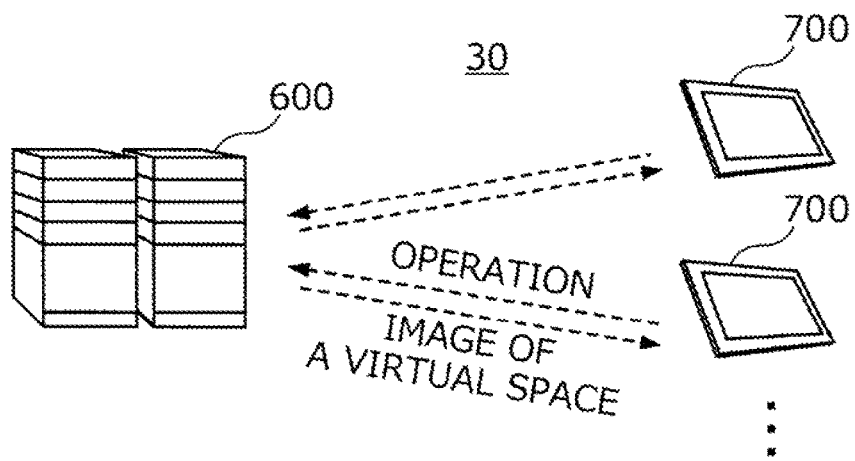
FIG. 12 is a diagram illustrating a configuration of a system according to a third embodiment of the present disclosure.

FIG. 12 is a diagram illustrating the configuration of the system according to the third embodiment of the present disclosure. Referring to FIG. 12, the system 30 includes a server 600 that provides virtual space service, and terminal devices (clients) 700. The server 600 and the terminal device 700 are connected to each other by a network.

The server 600 are configured by one or more server devices. The server device can be realized by the hardware configuration of the information processing device described later. The server 600 provides the service to a plurality of the terminal devices 700. More specifically, the server 600 generates the virtual space in which the character operated by the user of the terminal device 700 is located, and delivers the information for displaying the image of the virtual space to the terminal device 700. For example, the character is capable of performing various actions including speech (comment) in the virtual space, in accordance with the operation of the user of the terminal device 700.

The terminal device 700 can be various types of terminal devices capable of displaying the virtual space and operating the character located in the virtual space, such as for example, a tablet terminal, a smartphone, a television, a personal computer, or a game machine. The terminal device 700 can be realized by the hardware configuration of the information processing device described later, for example. As above, in the terminal device 700, the image of the virtual space is displayed in accordance with the information delivered from the server 600. The user can operate the character located in the virtual space, by giving the operation input to the terminal device 700. As described above, the character is able to speak in the virtual space, and therefore can enjoy the interaction with another user by the speech and obtain the advice from the speech of another user, for example. Also, by looking at the action of other users in the virtual space without speaking, the character can obtain the hint relevant to the behavior in the virtual space, or feel the bustle in the virtual space simply, for example.

In order for the experience sharing to arise in the above virtual space, a certain number of characters are to be present in the virtual space. However, for example, when the users are few because the service itself provided by the server 600 is new, or in the time period such as early morning when the users are few, or when the virtual space is enlarged and the characters are dispersed in the wide range, or the like, a sufficient number of characters possibly are not present in the virtual space.

Therefore, in the present embodiment, in various scenes in the virtual space, the server 600 reproduces the action of the character of another user in the scene similar to that scene. The character of another user virtually performs the action in the virtual space, so that the user who utilizes the service in the situation with few people can virtually listen to the speech of another user, and look at the action of another user.

Figure 13:
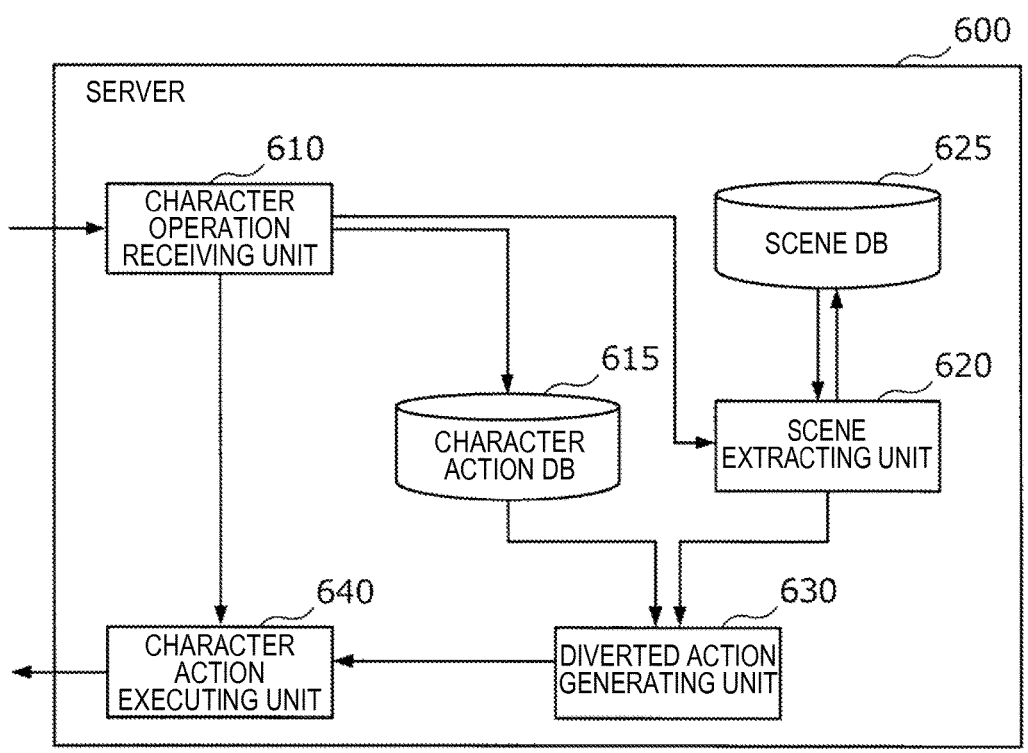
FIG. 13 is a diagram illustrating a schematic function and structure of a server according to a third embodiment of the present disclosure.

FIG. 13 is a diagram illustrating the schematic function and structure of the server according to the third embodiment of the present disclosure. Referring to FIG. 13, the server 600 includes a character operation receiving unit 610, a scene extracting unit 620, a diverted action generating unit 630, and a character action executing unit 640. Each of their functions and structures can be realized by the processor of the server device configuring the server 600 which operates in accordance with programs stored in a memory or a storage. Also, the server 600 may also include a character action DB 615, and a scene DB 625. These databases can be realized by the memory or the storage of the server device configuring the server 600, for example. In the following, these functions and structures will be described.

The character operation receiving unit 610 receives the operation of the character which is input by the user at the terminal device 700, from the terminal device 700. The character operation receiving unit 610 provides the received operation to the character action executing unit 640 in order to reflect the received operation in the action of the character located in the virtual space, and stores the received operation in the character action DB 615 in association with the information indicating the scene of the virtual space in which the action is executed. The operation of the character in the virtual space is an example of the activity of the user in the scene of the content (the virtual space). Note that, in the present embodiment, the scene of the content means a specific situation defined in the virtual space (the content) which changes along the time axis.

The scene extracting unit 620 extracts the scene similar to the scene in the virtual space when the user operates the character via the terminal device 700. As described above, in the present embodiment, the scene means a specific situation defined in the virtual space. When the situation equal or similar to the situation when the user operates the character is not registered in the scene DB 625, the scene extracting unit 620 may newly register the situation in the scene DB 625. At this time, the scene extracting unit 620 may cluster the actually-arising situations, and register them in the scene DB 625 as a finite number of groups. The information indicating the scene of the virtual space in the scene DB 625 and the information indicating the scene of the virtual space in the character action DB 615 are common or correspondent to each other.

The diverted action generating unit 630 reads out, from the character action DB 615, the action of the character executed by the operation of another user in the scene extracted by the scene extracting unit 620, and reproduces the same action in the virtual space. The action of the character is an example of the feedback that arises by the activity (the operation of the character) of the user in the scene of the content (the virtual space). For example, the diverted action generating unit 630 may make an appearance of the character that executes the action read out from the character action DB 615, in the virtual space. Also, the diverted action generating unit 630 may extract and reproduce a part of an action such as speech (comment) of the character. The diverted action generating unit 630 provides the information indicating the action of the reproduced character, to the character action executing unit 640. Note that the action of the character reproduced by the diverted action generating unit 630 may be displayed in a distinguishable manner from the action of the character existing in the virtual space.

The character action executing unit 640 executes the action of the character in the virtual space, in accordance with the operation of the character by the user received by the character operation receiving unit 610, and the information provided from the diverted action generating unit 630. More specifically, the character action executing unit 640 changes the graphic of the character located in the virtual space, and displays the speech (the comment) of the character as text. Also, the virtual space itself can change by the action of the character. The character action executing unit 640 delivers the information for displaying the image of the virtual space that changes in such a manner to reflect the action of the character, to the terminal device 700.

Figure 14:
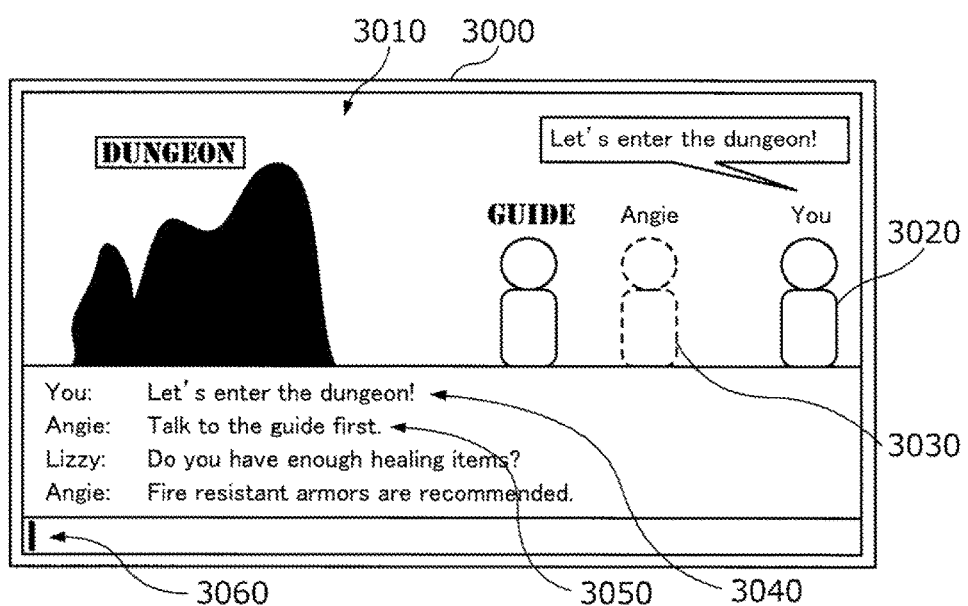
FIG. 14 is a diagram illustrating an exemplary display of a third embodiment of the present disclosure.

FIG. 14 is a diagram illustrating an exemplary display of the third embodiment of the present disclosure. Referring to FIG. 14, the screen image 3000 displayed on the display of the terminal device 700 in the present embodiment includes a virtual space image 3010, a character image 3020, a reproduced character image 3030, a speech log 3040, a reproduced speech log 3050, and a speech input area 3060.

The virtual space image 3010 displays the virtual space in accordance with the information delivered from the server 600. The character image 3020 displays the character located in the virtual space, and is included in the virtual space image 3010. For example, the character image 3020 includes the character operated by the user of the terminal device 700, and the character operated by another user. The reproduced character image 3030 is the same image as the character image 3020, but is not operated in real time by another user and is displayed by the function of the diverted action generating unit 630 of the server 600. The speech log 3040 is a text log describing the speech (the comment) of the character located in the virtual space. For example, the speech log 3040 includes the speech by the user of the terminal device 700, and the speech by another user. The reproduced speech log 3050 is the same text log as the speech log 3040, but is not what the user of the terminal device 700 and another user speak in real time, and is displayed by the function of the diverted action generating unit 630 of the server 600.

In the example illustrated in the drawing, the user of the terminal device 700 can look at the reproduced character image who speaks to the guide in front of the dungeon, to know that the user had better speak to the guide before entering into the dungeon, for example. Also, the user can obtain the information about the preparation before entering into the dungeon, by the information displayed as the reproduced speech log 3050. Also, without those benefits particularly, the user can look at the figure and the speech of another character, or feel the bustle of the virtual space.

Figure 15:
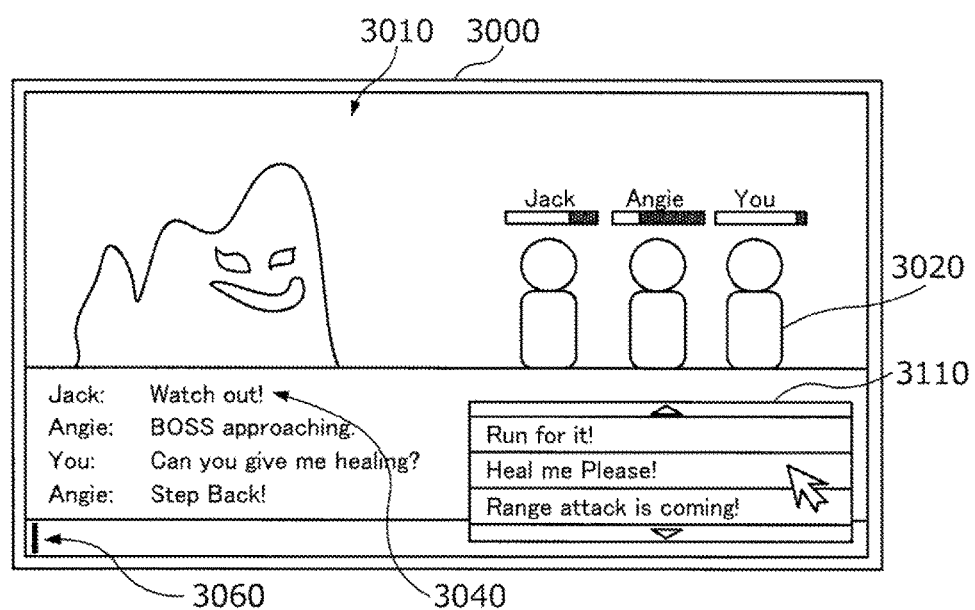
FIG. 15 is a diagram illustrating a variant example of a third embodiment of the present disclosure.

FIG. 15 is a diagram illustrating a variant example of the third embodiment of the present disclosure. Referring to FIG. 15, the screen image 3100 displayed on the display of the terminal device 700 in the present variant example includes a virtual space image 3010, a character image 3020, a speech log 3040, a speech input area 3060, and a speech list 3110.

In the example illustrated in the drawing, the candidates of the speech (the comment) that the user of the terminal device 700 inputs into the speech input area 3060 are displayed by the speech list 3110. The user may select the speech (the comment) from the speech list 3110, or input a text directly into the speech input area 3060 using the keyboard or the like. In the present variant example, the diverted action generating unit 630 generates the text which is to be displayed in the speech list 3110, on the basis of the information of the speech (the comment) stored in the character action DB 615. The texts displayed on the speech list 3110 can be the texts spoken by the user of the terminal device 700 himself or herself, or another user, in the scene equal or similar to the current scene in the virtual space displayed on the terminal device 700.

For example, during the battle or the like arising in the virtual space, the user sometimes does not have a sufficient time for inputting a text into the speech input area 3060 using the keyboard. Also, for example, when the terminal device 700 is the game machine, the text input section of the terminal device 700 is not appropriate for quick input, which possibly results in missing the timing of the speech. Therefore, the speech list 3110 is displayed in the present variant example, so that an appropriate speech that fits into the situation is quickly executed. When the speech list 3110 is displayed based on the speech of the user of the terminal device 700 in the past, the speech is made without impairing the personality of the user, even though selected from the list. Also, when the speech list 3110 includes the speech of another user, an appropriate speech is quickly executed in various situations, taking in the experience of another user.

FIG. 16 is a diagram illustrating an example of the data in the third embodiment of the present disclosure. Referring to FIG. 16, the data 3500 stored in the database of the server 600 in the present embodiment includes a scene ID 3510, a place 3520, a situation 3530, a hit point (HP) 3540, and an action 3550. Note that the data 3500 illustrated in the drawing corresponds to both of the exemplary display described above with reference to FIG. 14 and the variant example described with reference to FIG. 15.

The scene ID 3510 is an ID for uniquely identifying a scene. The place 3520 indicates a place in the virtual space where each scene is defined, for example, with the coordinates in the virtual space, or the name of the place set in the virtual space (in the example illustrated in the drawing, dungeon, field, and the like). The situation 3530 indicates a situation that arises in the virtual space in such a manner that the situations that arise in the virtual space are classified into several patterns (in the example illustrated in the drawing, entrance, boss encount, attacked, moving, and so on). The hit point 3540 indicates a stamina value of the character defined in the virtual space. The action 3550 indicates various actions of the character which are executed by the operation of the user, for example speech and other actions (speak to the guide, run around, and the like).

For example, in the case of the example illustrated in FIG. 14, the speech and the behavior of another user are reproduced by the reproduced character image 3030 and the reproduced speech log 3050, for the user present at the entrance of the dungeon in the virtual space, on the basis of the records 3500a, 3500b. Also, for example, in the case of the example illustrated in FIG. 15, the speech list 3110 is provided for the user during the battle against the boss (the monster) in the virtual space, on the basis of the records 3500c to 3500e.

Although, in the example illustrated in FIG. 16 above, the data of the character action DB 615 and the scene DB 625 in the server 600 is stored in a combined manner, the data may be stored in a separate manner in order to be combined and used as necessary.

Figure 17:
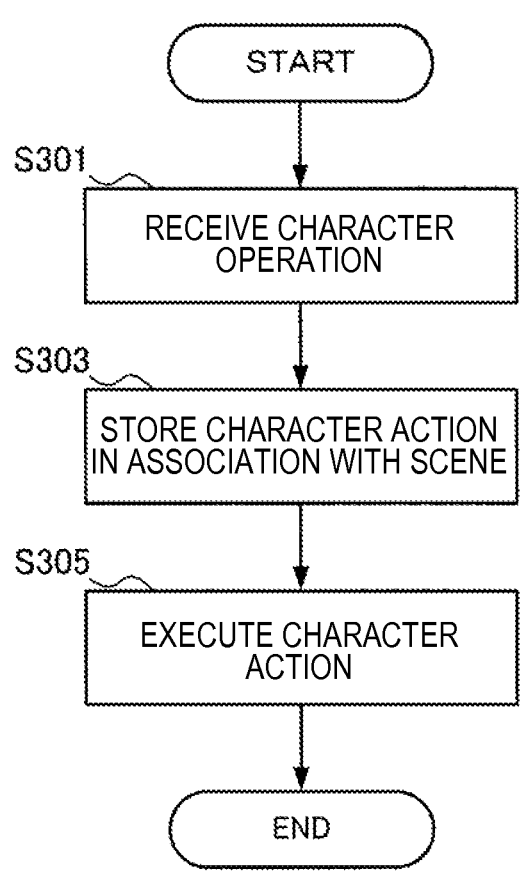
FIG. 17 is a flowchart illustrating a first exemplary process for a character action in a server according to a third embodiment of the present disclosure.

FIG. 17 is a flowchart illustrating a first exemplary process for the character action in the server according to the third embodiment of the present disclosure. Referring to FIG. 17, in the server 600, the character operation receiving unit 610 receives the operation of the character, which is input by the user of the terminal device 700 (S301). The character operation receiving unit 610 stores the action of the character which is realized by the operation, in the character action DB 615, in association with the information indicating the scene of the virtual space in which the action is executed (S303). Also, the character operation receiving unit 610 provides the input operation to the character action executing unit 640 in order to reflect the input operation in the action of the character located in the virtual space in real time, and the character action executing unit 640 executes the action of the character on the basis of the provided information (S305).

Figure 18:
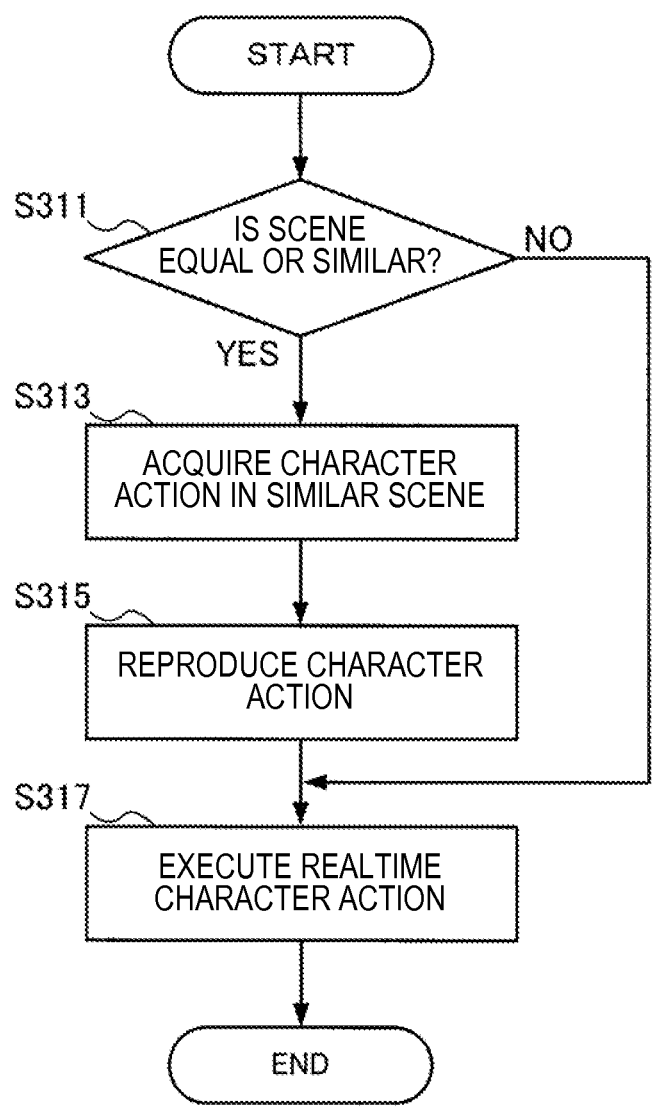
FIG. 18 is a flowchart illustrating a second exemplary process for a character action in a server according to a third embodiment of the present disclosure.

FIG. 18 is a flowchart illustrating a second exemplary process for the character action in the server according to the third embodiment of the present disclosure. Referring to FIG. 18, in the server 600, first, the scene extracting unit 620 determines whether or not the scene in the virtual space when the user operates the character is equal or similar to the scene registered in the scene DB 625, with reference to the scene DB 625 (S311). Here, when the scene is equal or similar to the registered scene (YES), the diverted action generating unit 630 acquires the information indicating the action of another character in the equal or similar scene, from the character action DB 615 (S313), and the character action executing unit 640 reproduces the action of another character on the basis of this information (S315).

On the other hand, if the scene of the virtual space is not similar to the registered scene in S311 (NO), the diverted action generating unit 630 does not generate the information for reproducing the action of another character. Regardless of whether or not the action of another character is reproduced, the character action executing unit 640 executes the real-time character action on the basis of the operation received by the character operation receiving unit 610 (S317). The above process for the character action is executed, for example, when the character operation receiving unit 610 receives the operation, or on a regular basis, so that the real-time character action and the reproduced character action are displayed in the virtual space at the terminal device 700.

4. Hardware Configuration

Figure 19:
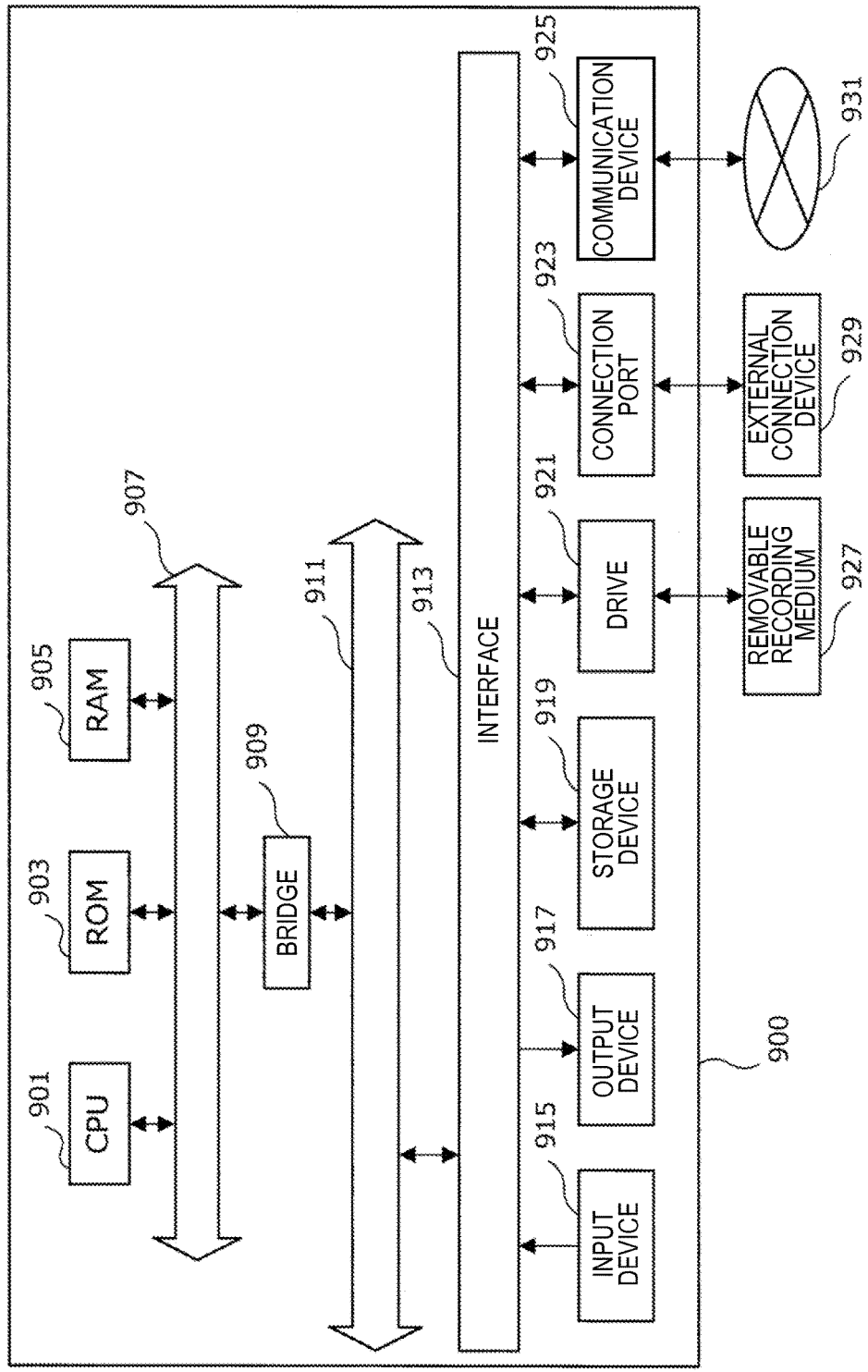
FIG. 19 is a block diagram illustrating an exemplary hardware configuration of an information processing device according to an embodiment of the present disclosure.

Next, a hardware configuration of an information processing device according to an embodiment of the present disclosure will be described with reference to FIG. 19. FIG. 19 is a block diagram illustrating a hardware configuration example of the information processing device according to the embodiment of the present disclosure. An information processing device 900 shown in FIG. 10 may realize, for example, the server device and the terminal device in the above-described embodiment.

The information processing device 900 includes a central processing unit (CPU) 901, a read-only memory (ROM) 903, and a random access memory (RAM) 905. The information processing device 900 may also include a host bus 907, a bridge 909, an external bus 911, an interface 913, an input device 915, an output device 917, a storage device 919, a drive 921, a connection port 923, and a communication device 925. Furthermore, where appropriate, the information processing device 900 may include an imaging device 933 and a sensor 935. The information processing device 900 may have a processing circuit, such as a so-called digital signal processor (DSP) or a so-called application specific integrated circuit (ASIC), in place of or in addition to the CPU 901.

The CPU 901 functions as an arithmetic processor and a controller and controls the overall operation or a part thereof within the information processing device 900 in accordance with various kinds of programs recorded in the ROM 903, the RAM 905, the storage device 919, or a removable recording medium 927. The ROM 903 stores, for example, arithmetic parameters and programs to be used by the CPU 901. The RAM 905 temporarily stores, for example, a program executed by the CPU 901 as well as parameters that appropriately change during the execution of the program. The CPU 901, the ROM 903, and the RAM 905 are connected to each other via the host bus 907, which is constituted of an internal bus such as a CPU bus. Furthermore, the host bus 907 is connected to the external bus 911, such as a peripheral component interconnect/interface (PCI), via the bridge 909.

The input device 915 is a user-operable device, such as a mouse, a keyboard, a touchscreen, a button, a switch, and a lever. The input device 915 may be, for example, a remote control device that uses infrared or other electric waves, or an external connection device 929 such as a portable telephone that complies with operation of the information processing device 900. The input device 915 includes an input control circuit that generates an input signal based on information input by the user and that outputs the input signal to the CPU 901. The user may operate this input device 915 so as to input various kinds of data to the information processing device 900 or to command the information processing device 900 to perform processing.

The output device 917 is constituted by a device that is capable of visually or aurally notifying the user of acquired information. The output device 917 may be, for example, a display device, such as a liquid crystal display (LCD), a plasma display panel (PDP), or an organic electroluminescence (EL) display, an audio output device, such as a speaker and a headphone, and a printer. The output device 917 outputs an obtained result of processing performed by the information processing device 900 in the form of text or an image and also in the form of voice or sound.

The storage device 919 is a data storage device formed as an example of a storage unit of the information processing device 900. The storage device 919 is constituted of, for example, a magnetic storage device, such as a hard disk drive (HDD), a semiconductor storage device, an optical storage device, or a magneto-optical storage device. This storage device 919 stores, for example, various kinds of data and programs executed by the CPU 901, as well as various kinds of data acquired from an external source.

The drive 921 is a reader-writer for the removable recording medium 927, such as a magnetic disk, an optical disk, a magneto-optical disk, or a semiconductor memory, and is built inside or externally connected to the information processing device 900. The drive 921 reads information recorded in the mounted removable recording medium 927 and outputs the information to the RAM 905. Furthermore, the drive 921 records and writes information into the mounted removable recording medium 927.

The connection port 923 is a port used for directly connecting a device to the information processing device 900. The connection port 923 may be, for example, a universal serial bus (USB) port, an IEEE1394 port, or a small computer system interface (SCSI) port. Alternatively, the connection port 923 may be, for example, an RS-232C port, an optical audio terminal, or a high-definition multimedia interface (HDMI (registered trademark)) port. By connecting the external connection device 929 to the connection port 923, various kinds of data are exchangeable between the information processing device 900 and the external connection device 929.

The communication device 925 is, for example, a communication interface constituted of, for example, a communication device for connecting to a communication network 931. The communication device 925 may be, for example, a communication card for a wired or wireless local area network (LAN), Bluetooth (registered trademark), or a wireless USB (WUSB). Alternatively, the communication device 925 may be, for example, an optical communication router, an asymmetric digital subscriber line (ADSL) router, or various types of communication modems. For example, the communication device 925 exchanges a signal between the Internet and another communication device by using a predetermined protocol such as TCP/IP. The communication network 931 connected to the communication device 925 is a network connected in a wired or wireless manner and is, for example, the Internet, a domestic LAN, infrared communication, a radio-wave communication, or satellite communication.

An example of the hardware configuration of the information processing device 900 has been described above. Each of the components described above may be configured by using a general purpose component or may be configured by hardware specialized for the function of the component. The above configuration may be appropriately modified in accordance with the technological level at the time of implementation.

5. Supplement

The embodiments of the present disclosure may include, for example, the above-described information processing device, the above-described system, an information processing method executed by the information processing device or the system, a program for causing the information processing device to exhibits its function, and a non-transitory physical medium having the program stored therein.

Although preferred embodiments of the present disclosure have been described in detail above with reference to the appended drawings, the technical scope of the embodiments of the present disclosure is not limited to the above example. It is obvious to those with a general knowledge of the technical field of the embodiments of the present disclosure that various modifications and alterations may occur within the technical scope defined in the claims, and that these modifications and alterations are encompassed within the technical scope of the embodiments of the present disclosure.

Furthermore, the advantages discussed in this specification are only intended for illustrative and exemplary purposes and are not limitative. In other words, in addition to or in place of the above-described advantages, the technology according to the embodiments of the present disclosure may exhibit other advantages that are obvious to a skilled person from the specification.

Additionally, the present technology may also be configured as below.

(1) An information processing device including:
   an activity acquiring unit configured to acquire an activity of a first user in a first scene of content;
   a scene extracting unit configured to extract a second scene similar to the first scene from the content or another content; and
   a feedback diverting unit configured to divert a feedback that arises in the first scene in response to the activity of the first user, to the second scene provided to a second user.

(2) The information processing device according to (1), wherein
   the feedback diverting unit allows the feedback to arise in the second scene.

(3) The information processing device according to (2), wherein
   the activity includes inputting an comment for the first scene, and
   the feedback includes an output of the comment.

(4) The information processing device according to (3), wherein
   the feedback diverting unit displays the comment as a candidate of comment that the second user inputs for the second scene.

(5) The information processing device according to (2), wherein
   the activity includes giving an appreciation in the first scene, and
   the feedback diverting unit gives the appreciation in the second scene.

(6) The information processing device according to (5), wherein the first scene includes a situation of a third user in a social media when the third user conducts posting on the social media and the first user gives an appreciation to the posting, the second scene includes a situation of the second user in the social media when the second user conducts posting on the social media, and the feedback diverting unit gives the appreciation given to the posting of the third user from the first user in the first scene, to the posting of the second user in the second scene.

(7) The information processing device according to (2), wherein the activity includes an operation of a character in a virtual space provided in the first scene, and the feedback diverting unit reproduces an action of the character in accordance with the operation, in the second scene.

(8) The information processing device according to any one of (1) to (7), wherein the scene extracting unit extracts the second scene on the basis of a feature value of the content in the first scene.

(9) The information processing device according to any one of (1) to (7), wherein the scene extracting unit extracts the second scene on the basis of meta information given to the first scene.

(10) The information processing device according to any one of (1) to (7), wherein the scene extracting unit extracts the second scene on the basis of a virtual space provided in the first scene or a state of a character located in the virtual space.

(11) The information processing device according to (10), wherein the scene extracting unit extracts the second scene on the basis of information indicating a position in the virtual space at which the character is located in the first scene.

(12) An information processing method including:

acquiring an activity of a first user in a first scene of content;

extracting a second scene similar to the first scene from the content or another content; and diverting, by a processor, a feedback that arises in the first scene in response to the activity of the first user, to the second scene provided to a second user.

(13) A program for causing a computer to implement:

a function to acquire an activity of a first user in a first scene of content;

a function to extract a second scene similar to the first scene from the content or another content; and a function to divert a feedback that arises in the first scene in response to the activity of the first user, to the second scene provided to a second user.

What is claimed is:

1. An information processing device, comprising:

an activity acquiring unit configured to acquire an activity of a first user in a first scene of first content;

a scene extracting unit configured to extract a second scene similar to the first scene from at least one of the first content or a second content, based on a feature value of the first scene and a virtual space in the first scene, wherein the second content is different from the first content, wherein the feature value, calculated based on analysis of the first scene, comprises at least an audible feature of the first scene; and a feedback diverting unit configured to divert a feedback, that arises in the first scene based on the activity of the first user, to the second scene presented to a second user.

2. The information processing device according to claim 1, wherein the feedback diverting unit is further configured to cause the feedback to arise in the second scene.

3. The information processing device according to claim 2, wherein the activity includes an input of a first comment for the first scene, and wherein the feedback includes an output of the first comment.

4. The information processing device according to claim 3, wherein the feedback diverting unit is further configured to display the first comment as a candidate comment for a second comment that the second user inputs for the second scene.

5. The information processing device according to claim 2, wherein the activity includes grant of an appreciation in the first scene, and wherein the feedback diverting unit is further configured to give the appreciation in the second scene.

6. The information processing device according to claim 5, wherein the first scene includes a situation of a third user in a social media where the third user conducts a first post on the social media and the first user gives the appreciation to the first post, wherein the second scene includes a situation of the second user in the social media where the second user conducts a second post on the social media, and wherein the feedback diverting unit is further configured to give the appreciation given to the first post of the third user from the first user in the first scene, to the second post of the second user in the second scene.

7. The information processing device according to claim 2, wherein the activity includes an operation of a character in the virtual space in the first scene, and wherein the feedback diverting unit is further configured to reproduce, based on the operation, an action of the character in the second scene.

8. The information processing device according to claim 1, wherein the scene extracting unit is further configured to extract the second scene based on meta information associated with the first scene.

9. The information processing device according to claim 1, wherein the scene extracting unit is further configured to extract the second scene based on a state of a character located in the virtual space.

10. The information processing device according to claim 9, wherein the scene extracting unit is further configured to extract the second scene based on position information in the virtual space at which the character is located in the first scene.

11. An information processing method, comprising:

acquiring an activity of a first user in a first scene of first content;

extracting a second scene similar to the first scene from at least one of the first content or a second content, based on a feature value of the first scene and a virtual space in the first scene, wherein the second content is different from the first content, wherein the feature value, calculated based on analysis of the first scene, comprises at least an audible feature of the first scene; and diverting, by a processor, a feedback that arises in the first scene based on the activity of the first user, to the second scene presented to a second user.

12. A non-transitory computer-readable medium having stored thereon, computer-readable instructions which when executed by a computer, cause the computer to execute operations, the operations comprising:
- acquiring an activity of a first user in a first scene of first content;
- extracting a second scene similar to the first scene from at least one of the first content or a second content, based on a feature value of the first scene and a virtual space in the first scene, wherein the second content is different from the first content,
- wherein the feature value, calculated based on analysis of the first scene, comprises at least an audible feature of the first scene; and
- diverting a feedback that arises in the first scene based on the activity of the first user, to the second scene presented to a second user.

\* \* \* \* \*